(12) United States Patent
Eatough et al.

(10) Patent No.: US 8,166,177 B1
(45) Date of Patent: Apr. 24, 2012

(54) SYSTEMS AND METHODS FOR MANAGING REQUESTS FOR CONNECTIONS TO SERVICES ON A COMPUTER SYSTEM

(75) Inventors: David A. Eatough, Herriman, UT (US); Alan B. Butt, Orem, UT (US)

(73) Assignee: Crimson Corporation, Dover, DE (US)

( * ) Notice: Subject to any disclaimer, the term of this patent is extended or adjusted under 35 U.S.C. 154(b) by 504 days.

(21) Appl. No.: 11/553,921

(22) Filed: Oct. 27, 2006

(51) Int. Cl.
*G06F 15/16* (2006.01)

(52) U.S. Cl. ........................................ 709/227; 719/311

(58) Field of Classification Search ................... 709/229, 709/223, 220, 245; 725/90; 719/314, 311, 719/331, 330; 386/46; 713/153
See application file for complete search history.

(56) References Cited

U.S. PATENT DOCUMENTS

| | | | |
|---|---|---|---|
| 6,108,782 A * | 8/2000 | Fletcher et al. ............... | 713/153 |
| 6,609,159 B1 * | 8/2003 | Dukach et al. ................ | 719/331 |
| 6,813,278 B1 | 11/2004 | Swartz et al. | |
| 6,938,257 B1 * | 8/2005 | Rapp et al. ..................... | 719/311 |
| 7,089,560 B1 * | 8/2006 | Uhler et al. .................... | 719/311 |
| 7,430,590 B1 * | 9/2008 | Rive et al. ...................... | 709/220 |
| 7,461,380 B2 * | 12/2008 | Nishimura ..................... | 719/314 |
| 2002/0169881 A1 * | 11/2002 | Fritsche et al. ............... | 709/229 |
| 2003/0005455 A1 * | 1/2003 | Bowers .......................... | 725/90 |
| 2003/0154118 A1 | 8/2003 | Druyan et al. | |
| 2005/0066056 A1 * | 3/2005 | Dominic ........................ | 709/245 |
| 2006/0218127 A1 | 9/2006 | Tate et al. | |
| 2007/0196074 A1 * | 8/2007 | Jennings et al. ................ | 386/46 |

* cited by examiner

*Primary Examiner* — Dustin Nguyen
(74) *Attorney, Agent, or Firm* — Austin Rapp & Hardman (57) ABSTRACT

In an exemplary method, a resident agent receives multiple requests from one or more requesting processes for connections to services. The requested services are hosted by a fast service host. The resident agent establishes multiple connections to the one or more requesting processes for the requested services. The resident agent notifies a single instance of a fast service host of the multiple connections. The resident agent facilitates communication between the requested services on the fast service host and the one or more requesting processes. This may involve establishing one or more routing connections to the fast service host, and routing data between the one or more requesting processes and the requested services on the fast service host.

21 Claims, 10 Drawing Sheets

SYSTEMS AND METHODS FOR MANAGING REQUESTS FOR CONNECTIONS TO SERVICES ON A COMPUTER SYSTEM

TECHNICAL FIELD

The present invention relates generally to computers and computer-related technology. More specifically, the present invention relates to systems and methods for managing requests for connections to services on a computer system.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Systems and methods for managing requests for connections to services on a computer system are disclosed. In an exemplary embodiment, a resident agent on a computer system receives multiple requests from one or more requesting processes for connections to services. The requested services are hosted by a fast service host. In response to the requests, the resident agent establishes multiple connections to the one or more requesting processes for the requested services. The resident agent notifies a single instance of the fast service host of the multiple connections, and facilitates communication between the requested services on the fast service host and the one or more requesting processes.

In some embodiments, facilitating communication between a requested service and a requesting process involves establishing a routing connection to the fast service host, and routing data between the requesting process and the requested service.

In some embodiments, establishing a routing connection to the fast service host involves notifying the fast service host of the connection to the requesting process, receiving connection information about a fast service host routing socket that is opened by the fast service host, opening a resident agent routing socket, and using the connection information to connect the resident agent routing socket to the fast service host routing socket. The resident agent may notify the fast service host of the connection to the requesting process by sending a connection notification message to the fast service host via a pipe. Also, the connection information may be received from the fast service host via a pipe.

In some embodiments, facilitating communication between a requested service and a requesting process involves delegating the connection that has been established with the requesting process to the fast service host. The connection may include a resident agent socket opened by the resident agent and a requesting process socket opened by the requesting process. Delegating the connection may involve passing the handle for the resident agent socket to the fast service host.

Command-oriented communication and data-oriented communication between the resident agent and the fast service host may be sent over different communication channels. Alternatively, command-oriented communication and data-oriented communication between the resident agent and the fast service host may be sent over a single communication channel.

In some embodiments, the computer system on which the resident agent resides may be a managed node in a computer network. The requesting process(es) may be located on an administrative system for the computer network. Alternatively, the requesting process(es) may be located on the managed node.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

A "service" is a program or routine that provides support to other programs (typically user applications) related to communication across a network. Some examples of services include HTTP, FTP, telnet, echo, POP3, SMTP, etc. Sometimes these kinds of services are referred to as Internet services.

Some systems include a daemon which manages requests for connections to services. This type of daemon is sometimes called a "super server." An example of a super server is xinetd (or, in older systems, inetd), which runs on UNIX®-based systems. Another example of a super server is the resident agent which is used by the LANDesk® Management Agent on Windows. In typical operation, the resident agent listens on ports that are used by services. When the resident agent receives a request for a particular service, the resident agent launches a service host application, which handles the request. The resident agent routes information to/from the launched service host using the standard input and standard output pipes that were created when the service host was launched.

The resident agent/service host model described above effectively minimizes the memory footprint of the resident agent, because services are (at least in general) kept loaded in memory only when they are being used. However, one drawback to the approach described above is that a new instance of the service host is started for each connection that is established.

Embodiments disclosed herein utilize an improved resident agent/service host model. In embodiments disclosed herein it is not necessary to start a new instance of the service host application for each service that is requested. Rather, a single instance of the service host application is capable of establishing multiple connections to the resident agent. Therefore, the resident agent is able to handle multiple connections for services using only a single instance of the service host.

In the discussion that follows, the service host application that is used in embodiments disclosed herein will be referred to as a fast service host application (or simply a fast service host). This is to distinguish the service host application that is used in embodiments disclosed herein from the service host application that is used in the current resident agent/service host model.

Figure 1:
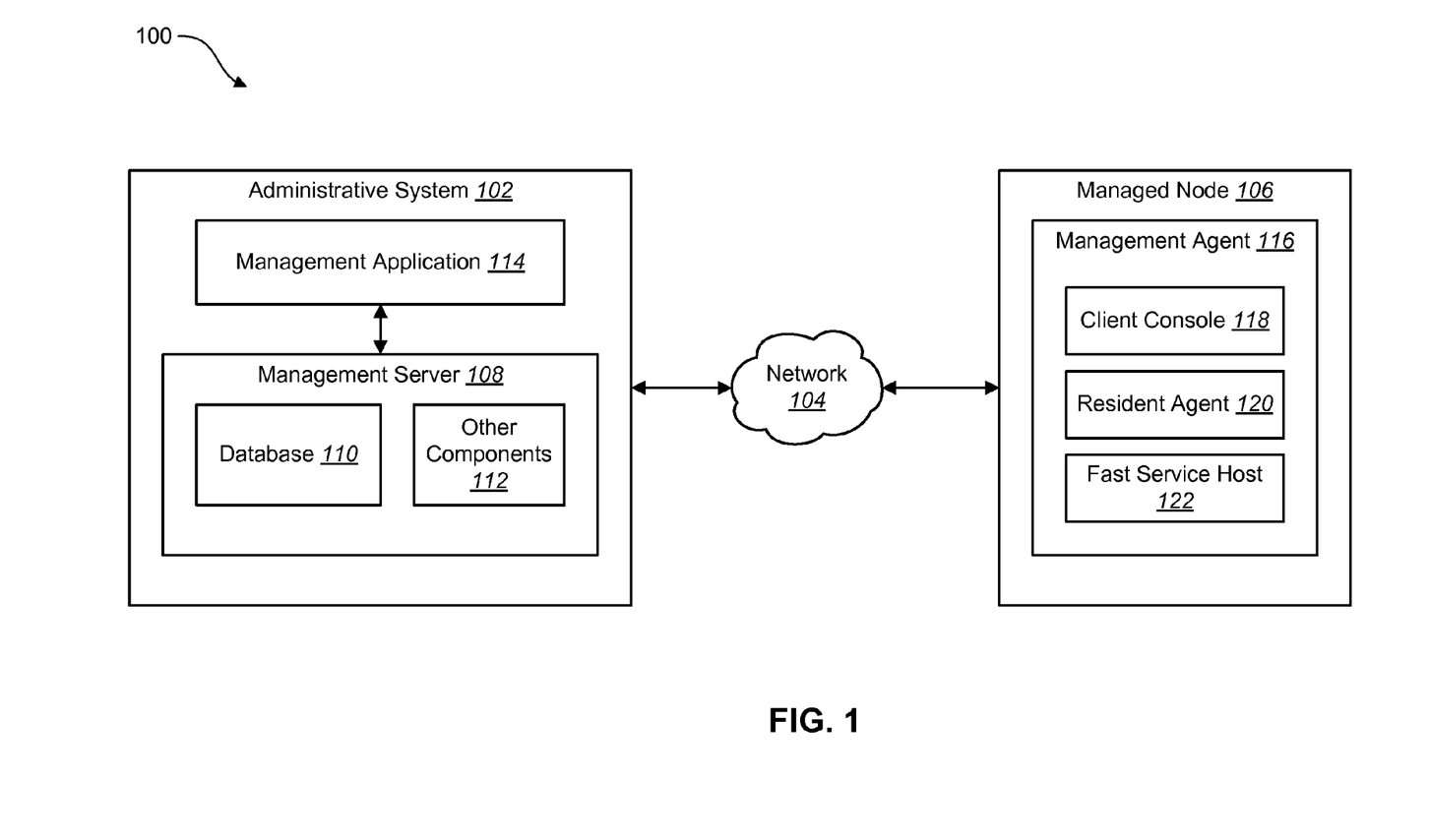
FIG. 1 illustrates an exemplary system in which embodiments may be practiced, including a resident agent and a fast service host.

FIG. 1 illustrates an exemplary system 100 in which embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 includes a database 110 of information. The management server 108 also includes various other components 112 that are configured to perform tasks such as scheduling, handling alerts, and so forth. An example of a management server 108 that may be used with embodiments disclosed herein is the core server for the LANDesk® Management Suite.

The administrative system 102 also includes a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite.

To enable a user of the administrative system 102 to perform management tasks via the management application 114, the managed node 106 includes a management agent 116. The management agent 116 performs management-related tasks in response to requests from the management application 114. An example of a management agent 116 that may be used is the LANDesk® Management Agent.

The management agent 116 hosts a client console application 118. The client console application 118 monitors hardware and software components on the managed node 106, as directed by the management agent 116. The management agent 116 also hosts a resident agent 120 and a fast service host 122. The operation of the resident agent 120 and the fast service host 122 according to various embodiments will be described below.

Figure 2:
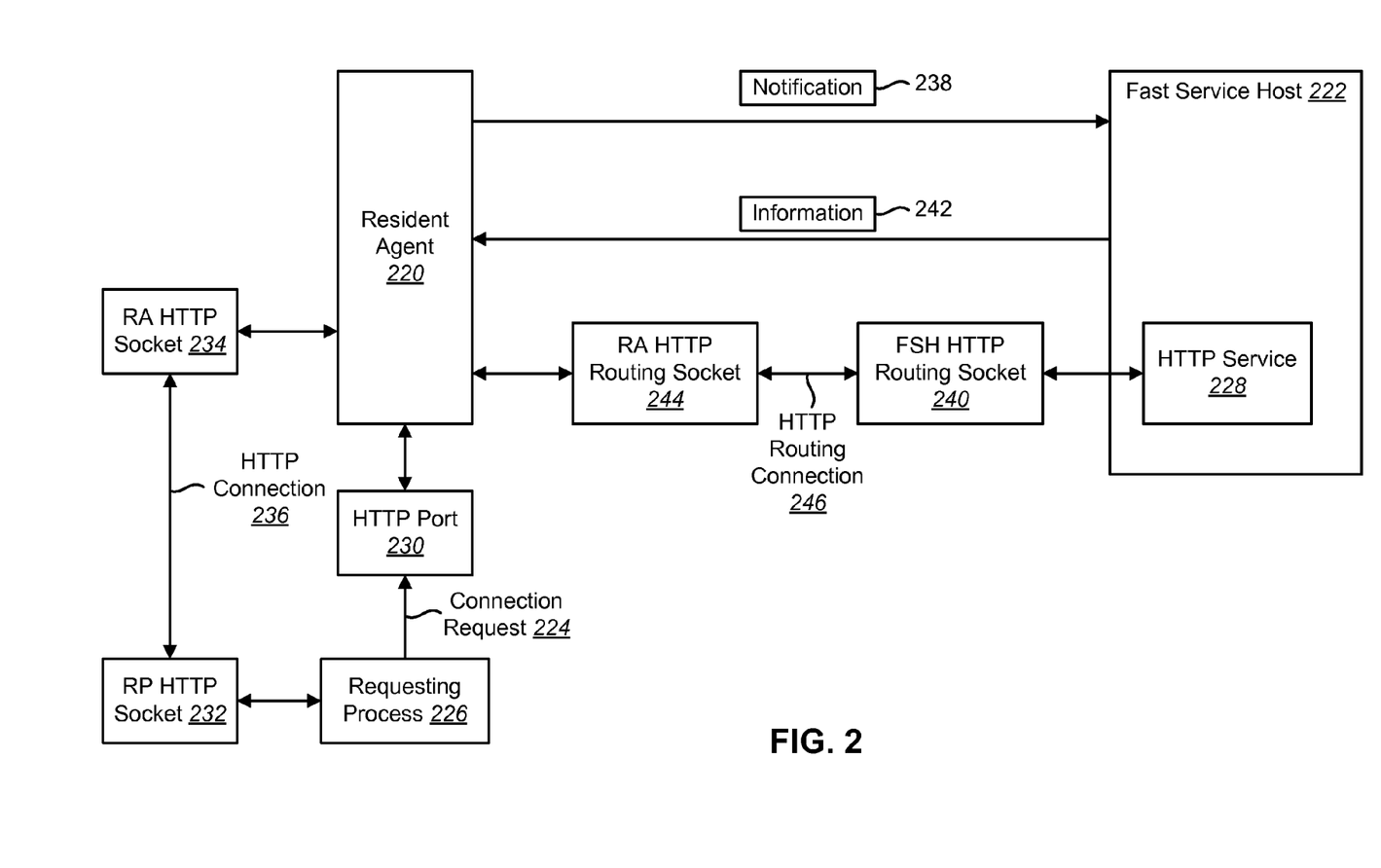
FIG. 2 illustrates the operation of the resident agent and the fast service host according to an embodiment in response to the resident agent receiving a request for a connection to the HTTP service from a requesting process.

FIG. 2 illustrates the operation of the resident agent 220 and the fast service host 222 according to an embodiment in response to the resident agent 220 receiving a request 224 for a connection to the HTTP service 228. The HTTP service 228 is hosted by the fast service host 222. The request 224 is received from a process 226 (e.g., the management application 114 in the system 100 shown in FIG. 1) that will be referred to as the requesting process 226. This requesting process may be on the same system as the resident agent 220 or on a remote network system (e.g., the administrative system 102).

The resident agent 220 listens on ports used by some or all of the available services, including the HTTP port 230. When the requesting process 226 wants to establish a connection to the HTTP service 228, the requesting process 226 sends a connection request 224 to the HTTP port 230. In response to receiving the connection request 224, the resident agent 220 opens a socket 234 for the connection. This socket 234 will be referred to as the resident agent HTTP socket 234. The requesting process 226 also opens a socket 232 for the connection. This socket 232 will be referred to as the requesting process HTTP socket 232. An HTTP connection 236 is established between the resident agent HTTP socket 234 and the requesting process HTTP socket 232.

In response to the HTTP connection 236 being established, the resident agent 220 determines whether the fast service host 222 is running. If the fast service host 222 is not running, the resident agent 220 launches the fast service host 222.

The resident agent 220 then facilitates communication between the requesting process 226 and the HTTP service 228. In the illustrated embodiment, this involves establishing a routing connection 246 to the HTTP service 228 on the fast service host 222, and then routing data between the requesting process 226 and the HTTP service 228.

To establish the routing connection 246, the resident agent 220 sends a connection notification message 238 to the fast service host 222. The connection notification message 238 informs the fast service host 222 of the HTTP connection 236 between the resident agent 220 and the requesting process 226. In response to receiving the connection notification message 238 and being notified of the HTTP connection 236, the fast service host 222 opens a socket 240 that will be used for routing HTTP data to/from the resident agent 220. This socket will be referred to herein as the fast service host HTTP routing socket 240.

The fast service host 222 sends a connection information message 242 back to the resident agent 220. The connection information message 242 provides the resident agent 220 with information for connecting to the fast service host HTTP routing socket 240. For example, the connection information message 242 may include the dynamic port that has been bound to the fast service host HTTP routing socket 240. In response to receiving the connection information message 242, the resident agent 220 opens its own HTTP routing socket 244. A connection 246 is established between the resident agent HTTP routing socket 244 and the fast service host HTTP routing socket 240. This connection 246 will be referred to as an HTTP routing connection 246. Once the HTTP routing connection 246 is established between the resident agent 220 and the HTTP service 228 on the fast service host 222, the resident agent 220 routes data between the requesting process 226 and the HTTP service 228.

Figure 3A:
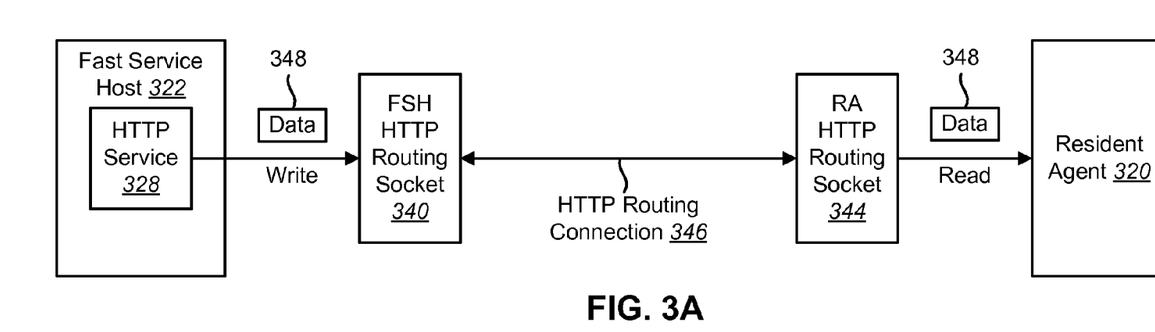
FIGS. 3A-3B illustrate the operation of the HTTP service, the resident agent, and the requesting process when the HTTP service sends HTTP data to the requesting process.
Figure 3B:
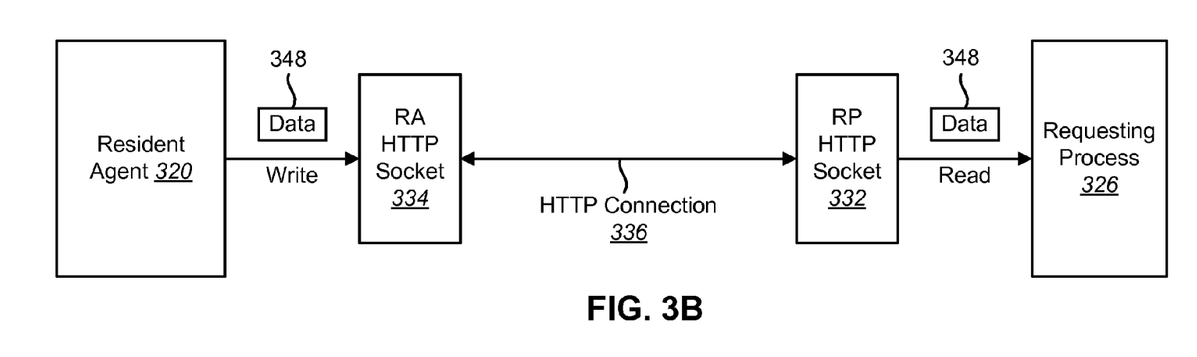

FIGS. 3A-3B illustrate the operation of the HTTP service 328 on the fast service host 322, the resident agent 320, and the requesting process 326 according to an embodiment when the HTTP service 328 sends HTTP data 348 to the requesting process 326. As shown in FIG. 3A, in order to send HTTP data 348 to the requesting process 326, the HTTP service 328 first sends the HTTP data 348 to the resident agent 320 via the HTTP routing connection 346. The HTTP service 328 does this by writing the HTTP data 348 to the fast service host HTTP routing socket 340. The resident agent 320 receives the HTTP data 348 by reading its HTTP routing socket 344.

As shown in FIG. 3B, the resident agent 320 then forwards the HTTP data 348 to the requesting process 326 via the HTTP connection 336. The resident agent 320 does this by writing the HTTP data 348 to its HTTP socket 334. The requesting process 326 receives the HTTP data 348 by reading its HTTP socket 332.

The resident agent 320 and the fast service host 322 operate in the manner described above in response to each connection request that is received from a requesting process 326. Consequently, a single instance of the fast service host 322 is able to handle multiple connections to the resident agent 320. This allows the resident agent 320 to handle multiple connections to requesting processes 326 with only a single instance of the fast service host 322 running.

Figure 4:
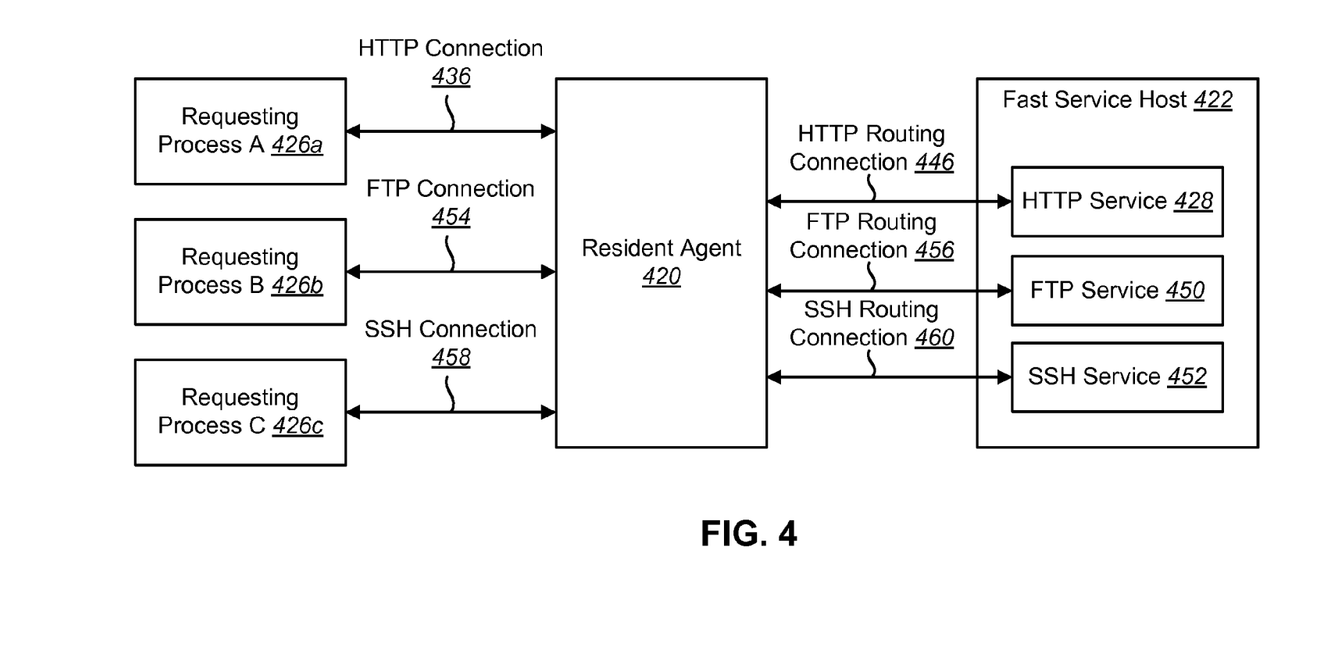
FIG. 4 illustrates various connections that may be established between the resident agent and the fast service host when the resident agent receives multiple requests for connections to services.

FIG. 4 illustrates various connections that may be established between the resident agent 420 and the fast service host 422 according to an embodiment when the resident agent 420 receives multiple requests for connections to services. In the example shown in FIG. 4, the resident agent 420 receives three connection requests. Requesting process A 426a requests a connection to the HTTP service 428. Requesting process B 426b requests a connection to the FTP service 450. Requesting process C 426c requests a connection to the SSH service 452.

In response to the connection request for the HTTP service 428, an HTTP connection 436 is established between the resident agent 420 and requesting process A 426a. In addition, an HTTP routing connection 446 is established between the resident agent 420 and the HTTP service 428 on the fast service host 422. The resident agent 420 routes HTTP data (not shown) between requesting process A 426a and the HTTP service 428.

Similar connections are established for the FTP service 450 and the SSH service 452. With respect to the FTP service 450, an FTP connection 454 is established between the resident agent 420 and requesting process B 426b. In addition, an FTP routing connection 456 is established between the resident agent 420 and the FTP service 450. The resident agent 420 routes FTP data (not shown) between requesting process B 426b and the FTP service 450. With respect to the SSH service 452, an SSH connection 458 is established between the resident agent 420 and requesting process C 426c. In addition, an SSH routing connection 460 is established between the resident agent 420 and the SSH service 452 on the fast service host 422. The resident agent 420 routes SSH data (not shown) between requesting process C 426c and the SSH service 452.

In the example shown in FIG. 4, the multiple connection requests come from different processes, namely requesting process A 426a, requesting process B 426b, and requesting process C 426c. Alternatively, a single process may request connections to multiple services. If this occurs, instead of establishing multiple connections to different processes, the resident agent 420 may establish multiple connections to the same process. For example, if the same process sent a request for a connection to the HTTP service 428, a request for a connection to the FTP service 450, and a request for a connection to the SSH service 452, the resident agent 420 may establish three separate connections (i.e., an HTTP connection, an FTP connection, and an SSH connection) with that process.

The requesting processes 426a, 426b, 426c in FIG. 4 may be located on one machine, including the local machine, or one or more remote machines. The connections may be established directly or through a router, proxy, gateway or other network device.

Also, in the example shown in FIG. 4, the different requesting processes request different kinds of Internet services, namely the HTTP service 428, the FTP service 450, and the SSH service 452. Alternatively, the resident agent 420 may receive multiple requests for the same service. If this occurs, the resident agent 420 may establish multiple routing connections to the fast service host 422 for the requested service (a separate routing connection for each request that is received). For example, if the resident agent 420 receives three requests for a particular service, the resident agent 420 may establish three routing connections to the fast service host 422 for the requested service.

FIG. 4 shows support for HTTP, FTP, and SSH protocols. Any connection oriented protocol may be used in conjunction with the resident agent 420 and fast service host application 422.

Figure 5:
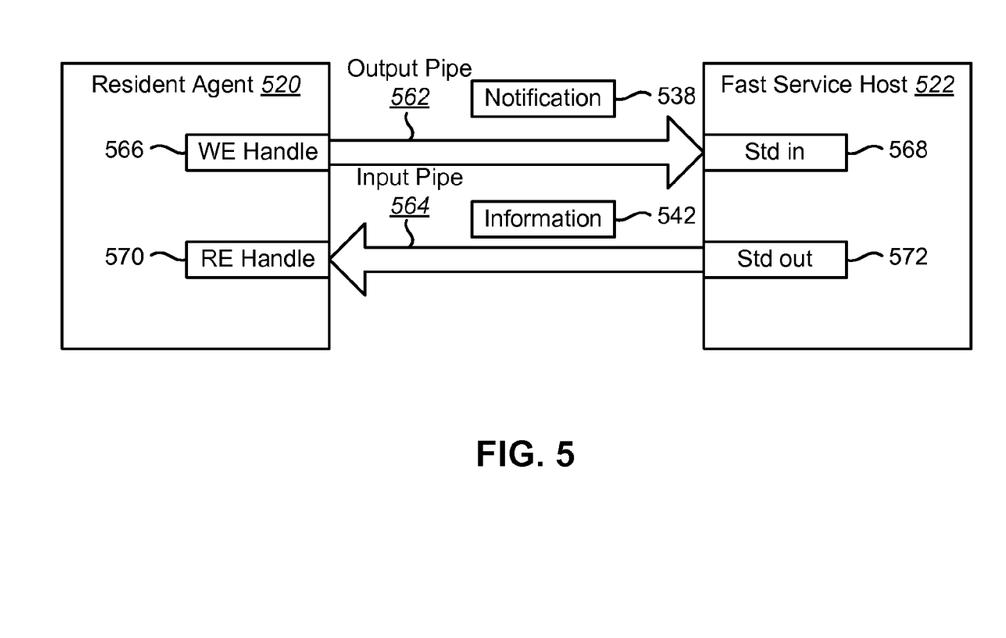
FIG. 5 illustrates an exemplary way that the resident agent and the fast service host may communicate in order to establish a routing connection.

FIG. 5 illustrates an exemplary way that the resident agent 520 and the fast service host 522 may communicate in order to establish a routing connection (such as the HTTP routing connection 246). When the fast service host 522 is launched, the resident agent 520 opens two pipes that are used to communicate with the fast service host 522, namely an output pipe 562 (for communication from the resident agent 520 to the fast service host 522) and an input pipe 564 (for communication from the fast service host 522 to the resident agent 520).

The resident agent 520 keeps the handle to the write end 566 of the output pipe 562. The handle to the read end of the output pipe 562 is made to be the standard input 568 of the fast service host 522. A connection notification message 538 may be sent from the resident agent 520 to the fast service host 522 via the output pipe 562.

The resident agent 520 keeps the handle to the read end 570 of the input pipe 564. The handle to the write end of the input pipe is made to be the standard output 572 of the fast service host 522. A connection information message 542 may be sent from the fast service host 522 to the resident agent 520 via the input pipe 564.

Figure 6:
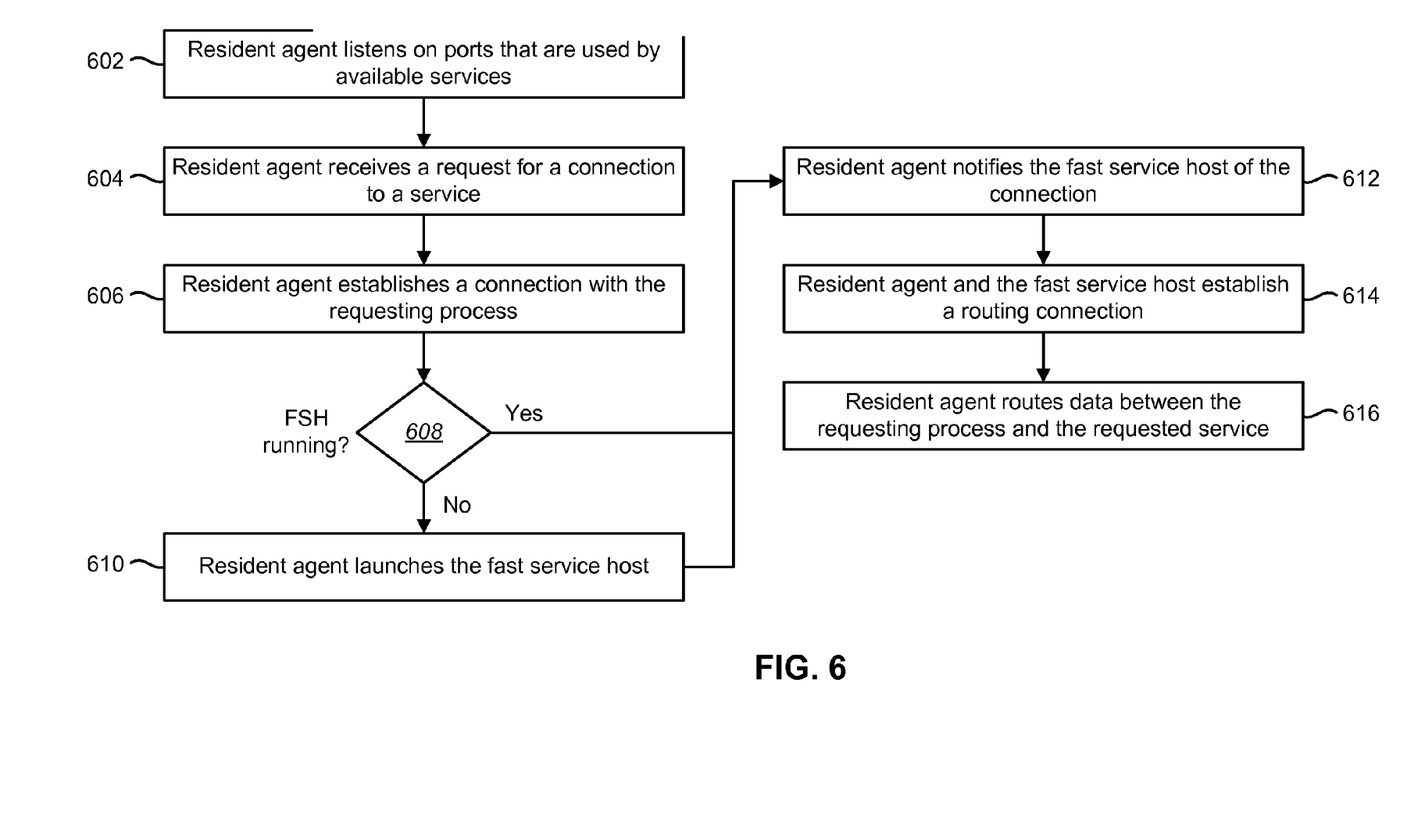
FIG. 6 illustrates a method which shows the operation of the resident agent and the fast service host according to an embodiment.

FIG. 6 illustrates a method 600 which shows the operation of the resident agent 220 and the fast service host 222 according to an embodiment. The resident agent 220 listens 602 on ports used by some or all of the available services. When a request is received 604 for a connection to a service, the resident agent 220 establishes 606 a connection with the requesting process 226.

In response to the connection being established, the resident agent 220 determines 608 if the fast service host 222 is running. If the fast service host 222 is already running, then the method 600 proceeds to step 612. If the fast service host 222 is not running, then the resident agent 220 launches 610 the fast service host 222.

The resident agent 220 notifies 612 the fast service host 222 of the connection that was established in step 606. For example, the resident agent 220 may use an output pipe 562 to the fast service host 222, and may send a connection notification message 238 to the fast service host 222 via the output pipe 562. In response, the resident agent 220 and the fast service host 222 establish 614 a routing connection. The resident agent 220 routes 616 data between the requesting process 226 and the requested service on the fast service host 222. When the resident agent 220 receives data from the requested service via the routing connection, the resident agent 220 sends the data to the requesting process 226. When the resident agent 220 receives data from the requesting process 226, the requesting process 226 sends the data to the requested service via the routing connection.

The method 600 is repeated whenever additional connection requests are received by the resident agent 220. Consequently, if multiple connection requests are received by the resident agent 220, multiple routing connections are established between the resident agent 220 and the fast service host 222 (as shown in FIG. 4). This allows the resident agent 220 to be able to handle multiple connections to requesting processes with only a single instance of the fast service host 222 running.

Figure 7:
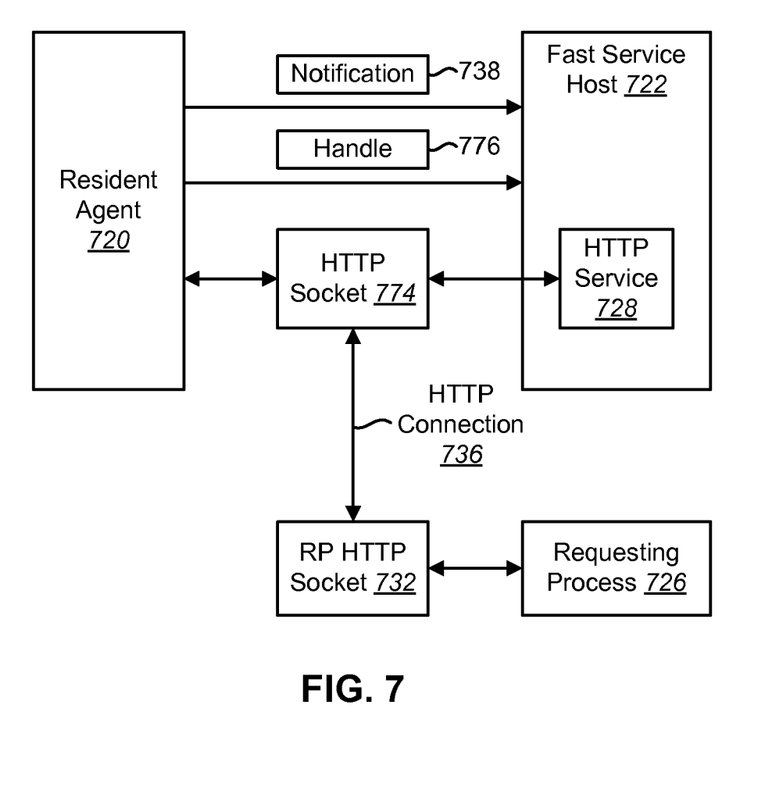
FIG. 7 illustrates the operation of the resident agent and the fast service host according to another embodiment in response to the resident agent receiving a request for the HTTP service from a requesting process.

FIG. 7 illustrates the operation of the resident agent 720 and the fast service host 722 according to another embodiment in response to the resident agent 720 receiving a request for the HTTP service 728 from a requesting process 726.

As in the embodiment described previously, in response to receiving a request (not shown) for a connection to the HTTP service 728, the resident agent 720 opens a socket 774 for the connection. This socket will be referred to as the HTTP socket 774. The requesting process 726 also opens a socket 732 for the connection. This socket 732 will be referred to as the requesting process HTTP socket 732. An HTTP connection 736 is established between the HTTP socket 774 and the requesting process HTTP socket 732.

Also as before, the resident agent 720 facilitates communication between the requesting process 726 and the HTTP service 728. In the illustrated embodiment, however, this involves delegating the HTTP connection 736 to the fast service host 722.

More specifically, in response to the HTTP connection 736 being established, the resident agent 720 sends a connection notification message 738 to the fast service host 722. The connection notification message 738 informs the fast service host 722 of the HTTP connection 736 between the resident agent 720 and the requesting process 726. The resident agent 720 then passes the handle 776 for the HTTP socket 774 to the fast service host 722. This allows the fast service host 722 to read to and write from the HTTP socket 774. Thus, in the illustrated embodiment it is not necessary for the resident agent 720 to route data between the requesting process 726 and the fast service host 722.

Figure 8A:
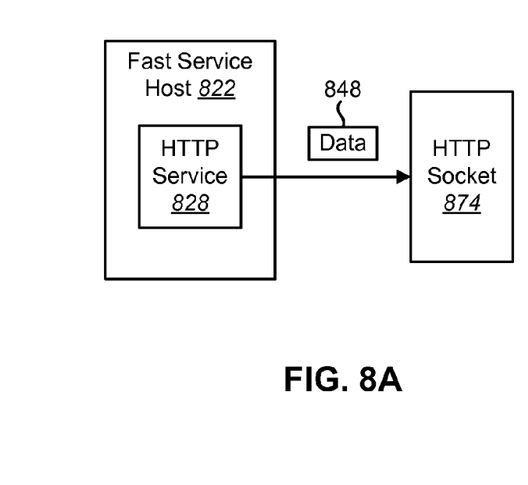
FIGS. 8A-8B illustrate the operation of the fast service host according to an embodiment in order to transmit HTTP data to the requesting process.
Figure 8B:
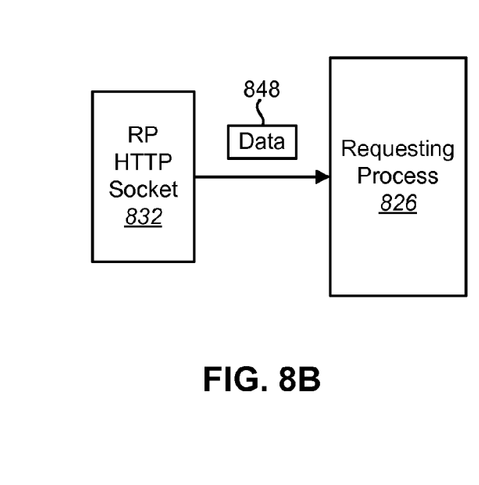

FIGS. 8A and 8B illustrate the operation of the fast service host 822 according to an embodiment in order to transmit HTTP data 848 to the requesting process 826. In FIG. 8A, the HTTP service 828 writes the HTTP data 848 to the HTTP socket 874. The HTTP service 828 is able to do this because it received the handle (not shown) for the HTTP socket 874 from the resident agent 820. In FIG. 8B, the requesting process 826 receives the HTTP data 848 by reading its HTTP socket 832.

In embodiments described to this point, the communication between the resident agent and the fast service host may be classified into two categories: command-oriented communication and data-oriented communication. An example of command-oriented communication is the connection notification message 238 sent from the resident agent 220 to the fast service host 222 (as discussed above in FIG. 2). An example of data-oriented communication is the HTTP data 348 sent from the HTTP service 328 on the fast service host 322 to the resident agent 320 (as discussed above in FIG. 3A).

Command-oriented communication between the resident agent and the fast service host may be sent on a separate communication channel from the data-oriented communication between the resident agent and the fast service host. For example, in the embodiment described in FIG. 5, command-oriented communication between the resident agent 520 and the fast service host 522 is sent via an output pipe 562 and an input pipe 564. However, in the embodiment described in FIG. 3, data-oriented communication between the resident agent 320 and the fast service host 322 is sent via an HTTP routing connection 346.

Figure 9:
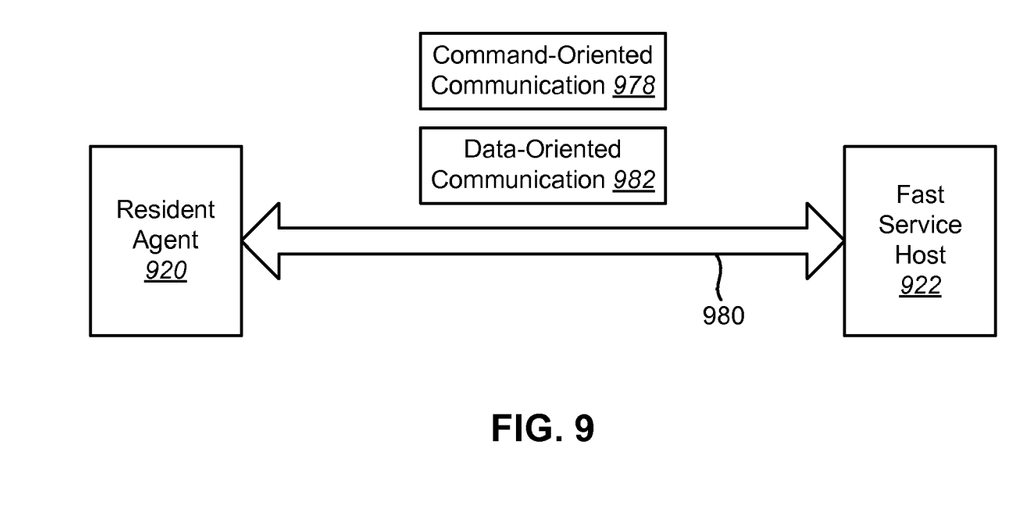
FIG. 9 is a block diagram illustrating the major hardware components typically utilized in a computer system.

Alternatively, as shown in FIG. 9, command-oriented communication 978 between the resident agent 920 and the fast service host 922 may be sent on the same communication channel 980 as data-oriented communication 982 between the resident agent 920 and the fast service host 922. The communication channel 980 may be a combination of an output pipe and an input pipe, such as the output pipe 562 and the input pipe 564 shown in FIG. 5 and discussed above in connection therewith. Alternatively, the communication channel 980 may be a socket connection that is established between the resident agent 920 and the fast service host 922.

Figure 10:
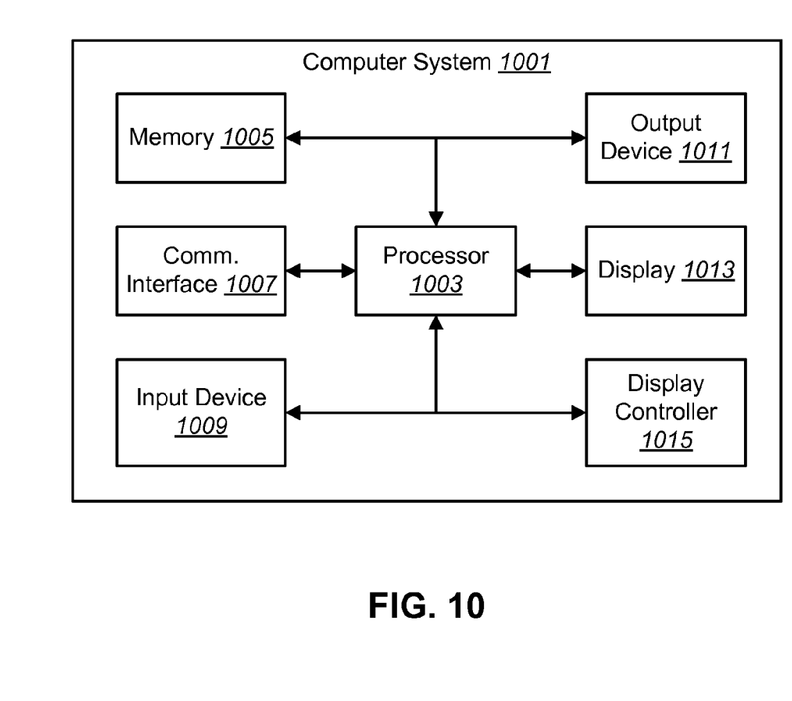
FIG. 10 is a block diagram illustrating the major hardware components typically utilized in a computer system.

FIG. 10 is a block diagram illustrating the major hardware components typically utilized in a computer system 1001. The illustrated components may be located within the same physical structure or in separate housings or structures.

The computer system 1001 includes a processor 1003 and memory 1005. The processor 1003 controls the operation of the computer system 1001 and may be embodied as a microprocessor, a microcontroller, a digital signal processor (DSP) or other device known in the art. The processor 1003 typically performs logical and arithmetic operations based on program instructions stored within the memory 1005.

As used herein, the term memory 1005 is broadly defined as any electronic component capable of storing electronic information, and may be embodied as read only memory (ROM), random access memory (RAM), magnetic disk storage media, optical storage media, flash memory devices in RAM, on-board memory included with the processor 1003, EPROM memory, EEPROM memory, registers, etc. The memory 1005 typically stores program instructions and other types of data. The program instructions may be executed by the processor 1003 to implement some or all of the methods disclosed herein.

The computer system 1001 typically also includes one or more communication interfaces 1007 for communicating with other electronic devices. The communication interfaces 1007 may be based on wired communication technology, wireless communication technology, or both. Examples of different types of communication interfaces 1007 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1001 typically also includes one or more input devices 1009 and one or more output devices 1011. Examples of different kinds of input devices 1009 include a keyboard, mouse, microphone, remote control device, button, joystick, trackball, touchpad, lightpen, etc. Examples of different kinds of output devices 1011 include a speaker, printer, etc. One specific type of output device which is typically included in a computer system is a display device 1013. Display devices 1013 used with embodiments disclosed herein may utilize any suitable image projection technology, such as a cathode ray tube (CRT), liquid crystal display (LCD), light-emitting diode (LED), gas plasma, electroluminescence, or the like. A display controller 1015 may also be provided, for converting data stored in the memory 1005 into text, graphics, and/or moving images (as appropriate) shown on the display device 1013.

Of course, FIG. 10 illustrates only one possible configuration of a computer system 1001. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for managing requests for connections to services on a computer system, the method being implemented by a resident agent on the computer system, the method comprising:
    receiving, at the resident agent, multiple requests from one or more requesting processes for connections to services, wherein the resident agent is hosted by a management agent on a managed node, and wherein the multiple requests are received from a management application on an administrative system;
    establishing multiple connections to the one or more requesting processes for the requested services;
    notifying a single instance of a fast service host of the multiple connections, wherein the requested services comprise different types of services, wherein the different types of services are hosted by the single instance of the fast service host, wherein the single instance of the fast service host is the only instance of the fast service host that is running;
    creating multiple routing connections to the single instance of the fast service host, a separate routing connection being created for each of the requested services; and
    facilitating communication between the requested services on the single instance of the fast service host and the one or more requesting processes.

2. The method of claim 1, wherein the multiple connections comprise a first connection to a first requesting process for a first service.

3. The method of claim 2, wherein facilitating communication between the first service and the first requesting process comprises:
    establishing a routing connection to the fast service host; and
    routing data between the first requesting process and the first service on the fast service host.

4. The method of claim 3, wherein establishing the routing connection comprises notifying the fast service host of the first connection.

5. The method of claim 4, wherein notifying the fast service host of the first connection comprises sending a connection notification message to the fast service host via a pipe.

6. The method of claim 3, wherein establishing the routing connection comprises:
    receiving connection information about a fast service host routing socket that is opened by the fast service host;
    opening a resident agent routing socket; and
    using the connection information to connect the resident agent routing socket to the fast service host routing socket.

7. The method of claim 6, wherein receiving the connection information comprises receiving a connection information message from the fast service host via a pipe.

8. The method of claim 2, wherein facilitating communication between the first service and the first requesting process comprises delegating the first connection to the fast service host.

9. The method of claim 8, wherein the first connection comprises a resident agent socket opened by the resident agent and a first requesting process socket opened by the first requesting process, and wherein delegating the first connection comprises passing a handle for the resident agent socket to the fast service host.

10. The method of claim 1, wherein command-oriented communication and data-oriented communication between the resident agent and the fast service host is sent over a single communication channel.

11. The method of claim 1, wherein the computer system is a managed node in a computer network.

12. A computer system that is configured for managing requests for connections to services on the computer system, the computer system comprising:
    a processor;
    memory in electronic communication with the processor;
    instructions stored in the memory, the instructions being executable to:
        receive, at a resident agent, multiple requests from one or more requesting processes for connections to services, wherein the resident agent is hosted by a management agent on a managed node, and wherein the multiple requests are received from a management application on an administrative system;
        establish multiple connections to the one or more requesting processes for the requested services;
        notify a single instance of a fast service host of the multiple connections, wherein the requested services comprise different types of services, wherein the different types of services are hosted by the single instance of the fast service host, wherein the single instance of the fast service host is the only instance of the fast service host that is running;
        create multiple routing connections to the single instance of the fast service host, a separate routing connection being created for each of the requested services; and
        facilitate communication between the requested services on the single instance of the fast service host and the one or more requesting processes.

13. The computer system of claim 12, wherein the multiple connections comprise a first connection to a first requesting process for a first service.

14. The computer system of claim 13, wherein the instructions executable to facilitate communication between the first service and the first requesting process comprise instructions executable to:
  establish a routing connection to the fast service host; and
  route data between the first requesting process and the first service on the fast service host.

15. The computer system of claim 13, wherein the instructions executable to facilitate communication between the first service and the first requesting process comprise instructions executable to delegate the first connection to the fast service host.

16. A computer-readable storage medium comprising executable instructions for a resident agent on a computer system to:
  receive, at the resident agent, multiple requests from one or more requesting processes for connections to services, wherein the resident agent is hosted by a management agent on a managed node, and wherein the multiple requests are received from a management application on an administrative system;
  establish multiple connections to the one or more requesting processes for the requested services;
  notify a single instance of a fast service host of the multiple connections, wherein the requested services comprise different types of services, wherein the different types of services are hosted by the single instance of the fast service host, wherein the single instance of the fast service host is the only instance of the fast service host that is running;
  create multiple routing connections to the single instance of the fast service host, a separate routing connection being created for each of the requested services; and
  facilitate communication between the requested services on the single instance of the fast service host and the one or more requesting processes.

17. The computer-readable storage medium of claim 16, wherein the multiple connections comprise a first connection to a first requesting process for a first service.

18. The computer-readable storage medium of claim 17, wherein the instructions executable to facilitate communication between the first service and the first requesting process comprise instructions executable to:
  establish a routing connection to the fast service host; and
  route data between the first requesting process and the first service on the fast service host.

19. The computer-readable storage medium of claim 17, wherein the instructions executable to facilitate communication between the first service and the first requesting process comprise instructions executable to delegate the first connection to the fast service host.

20. The method of claim 1, wherein the different types of services comprise an HTTP service, an FTP service and an SSH service.

21. The method of claim 1, further comprising receiving information from the fast service host for connecting the fast service host to the multiple connections.

* * * * *